United States Patent
Ferguson

Patent Number: 6,129,208
Date of Patent: Oct. 10, 2000

[54] PLANT FLAT-COLLAPSIBLE-CONTAINER

[75] Inventor: Roy G. Ferguson, Mississauga, Canada

[73] Assignee: Chantler Packaging Inc., Ontario, Canada

[21] Appl. No.: 09/226,587

[22] Filed: Jan. 6, 1999

[51] Int. Cl.[7] .......................... B65D 85/52; B65D 65/28; A01G 9/02

[52] U.S. Cl. ................... 206/423; 47/72; 47/84; 229/87.05

[58] Field of Search ................. 206/423; 229/87.05, 229/87.06; 47/72, 84; 383/105, 106, 71, 907, 116, 119

[56] References Cited

U.S. PATENT DOCUMENTS

| | | | |
|---|---|---|---|
| 3,262,629 | 7/1966 | Murphy et al. | 383/119 X |
| 3,376,666 | 4/1968 | Leonard | 206/423 X |
| 3,556,389 | 1/1971 | Gregoire . | |
| 4,091,925 | 5/1978 | Griffo . | |
| 4,333,267 | 6/1982 | Witte | 206/423 X |
| 4,413,725 | 11/1983 | Bruno et al. . | |
| 4,801,014 | 1/1989 | Meadows | 206/423 |
| 4,910,913 | 3/1990 | Streeter . | |
| 5,228,234 | 7/1993 | de Klerk et al. . | |
| 5,235,782 | 8/1993 | Landau . | |
| 5,388,695 | 2/1995 | Gilbert . | |
| 5,493,809 | 2/1996 | Weder et al. | 47/72 |
| 5,493,810 | 2/1996 | Weder et al. | 47/72 |
| 5,577,345 | 11/1996 | Weder et al. . | |
| 5,595,022 | 1/1997 | Weder | 47/72 |
| 5,625,979 | 5/1997 | Weder . | |
| 5,640,805 | 6/1997 | Weder . | |
| 5,647,168 | 7/1997 | Gilbert . | |
| 5,678,355 | 10/1997 | Mori . | |
| 5,687,845 | 11/1997 | Weder | 206/423 |
| 5,704,161 | 1/1998 | Weder . | |
| 5,722,200 | 3/1998 | Weder . | |
| 5,817,382 | 10/1998 | Cheng . | |
| 5,966,866 | 10/1999 | Ferguson . | |

FOREIGN PATENT DOCUMENTS

| | | |
|---|---|---|
| 0394595 | 4/1989 | European Pat. Off. . |
| 1432770 | of 1966 | France . |
| 2056410 | 8/1979 | United Kingdom . |

*Primary Examiner*—Bryon P. Gehman
*Attorney, Agent, or Firm*—Robert F. I. Conte; Lee, Mann, Smith, McWilliams, Sweeney & Ohlson

[57] ABSTRACT

A plant flat-collapsible-container made from a first panel of thin heat-sealable film, a second panel of thin heat-sealable film, a first decorative panel and a second decorative panel. The first panel, second panel, first decorative panel and second decorative panel are joined together along a first longitudinally-extending seam and a second longitudinally-extending seam. The first longitudinally-extending seam forms a first angle with a transverse axis of the container. The second longitudinally-extending seam forms a second angle with the a line drawn transverse to the axis of the container. The first and second angles can be the same, or, alternatively, the first angle can be between 55° and 65° and the second angle can be between 85° and 90°. The container can include a protruding portion which extends beyond a transversely-extending edge of the container. The protruding portion can have perforations.

1 Claim, 4 Drawing Sheets

PLANT FLAT-COLLAPSIBLE-CONTAINER

FIELD OF INVENTION

The invention relates to a plant flat-collapsible-container made of thermally sealable film.

BACKGROUND

Plant flat-collapsible-containers made of thin thermally sealable film are well-known. These containers, when empty and laid on a horizontal surface, lie flat. The containers generally have a trapezoidal shape. The containers when opened provide a cavity which is used to house plants. The containers when housing plants take on a three-dimensional frustoconical shape. As used herein, the term "plant" or "plants" is used in its broadest sense and includes anything falling within the plant kingdom, including flowers, cut flowers and potted plants.

U.S. Pat. No. 5,388,695, Gilbert, discloses an example of a plant flat-collapsible-container. The container is made of two thin film panels. The panels are heat sealed together, one on top of the other, along the container's equally angulated sides. The container, when empty, lies flat and has a trapezoidal shape. The panels are also heat sealed along the bottom end of the container. The top edges of each panel are freely separable to form the mouth of the container. The container thus forms a plant bag.

U.S. Pat. No. 5,228,234, de Klerk, shows another plant flat-collapsible-container. The container is also made from two thin film panels. The sides of each panel are also heat sealed along the container's equally angulated sides. The bottom edges of each panel are not necessarily sealed. Thus cut-flower stems can exit from the bottom of the container. A container with an unsealed bottom is known as a flower sleeve.

In de Klerk, one of the container panels has a top edge which protrudes beyond the top edge of the other container panel. The protruding part of the one container panel is perforated to create a tear line. When the containers are packed for dispensing, they are clamped together along the protruding part of the one container panel. The containers are then dispensed by tearing them from the plurality of containers, one by one, along the tear line.

U.S. Pat. No. 4,333,267, Witte, also describes a plant flat-collapsible container. The container also has a trapezoidal shape. The container is also made of two thin film panels which are also heat sealed one on top of the other. The panels are heat sealed only along the container's equally angulated sides. One of the container panels has a protruding top edge which can be folded over and adhesively sealed to the other container panel. Thus a user, after filling the container, can close the container by folding the protruding top edge of the one panel over the other panel.

Gilbert further discloses an example of how to make plant flat-collapsible-containers. The containers are made by intermittently advancing, in timed sequence, two webs. The webs are disposed one on top of the other. The webs are formed into containers in a single heat sealing station or multiple stations. In the heat sealing station a hot wire is applied to the two webs to form the side seams and bottom seams of the container. The two webs can be obtained from separate sheets of material or from a single sheet of double-folded material. The containers may be stamped or marked with promotional advertising during manufacture. The patent discloses the following machines as acceptable to perform the method: the Guard 200HS, available from Guard & Associates, Denver Colo.; and the Lemo 850K or 850KS, available from Lemo H. Lehmacher & Son, GmbH, Neiderkassel-Mondorf, Germany.

Producers, prior to shipping potted plants in plant flat-collapsible-containers, wrap the pot holding the plant in a decorative pot cover. The pot with the decorative cover is then dropped in the plant flat-collapsible-container. The container can be a flower bag or flower sleeve. The sleeve or bag protects the foliage of the potted plant and facilitates movement of the potted plant.

Shipping potted plants with decorative covers in sleeves or bags has problems. First, later removal of a portion of the sleeve or bag to expose the foliage may damage the foliage. Further, the sleeve or bag interferes with the visualization of the decorative pot cover. Additionally, using the pot cover in connection with a sleeve requires a lot of labor. The pot must be wrapped in the cover and then disposed in the sleeve.

To help resolve some of the problems associated with the use of pot covers and protective flower bags, industry has developed bags which have a decorative lower portion. The bags also have perforations to separate the top portion of the bag from the decorative lower portion. The lower portion of the bag, when separated from the top portion, doubles as a decorative pot cover. To make flower bags with decorative lower portions, industry has employed metalization techniques. These techniques give the lower portion of the bag a silver mirrored appearance. Industry has also used cheaper printing techniques to decorate the lower portion of the bag.

Using a bag with a decorative lower portion to double as a pot cover has drawbacks. First, many materials which have desirable decorative qualities lack the qualities needed in a protective bag. Conversely, many materials which have desirable protective qualities, such as low-density polyethylene, even with printing, are considered by the trade to have low aesthetic quality.

Industry has used sleeves made of two different materials. The materials are joined along the sleeve's minor axis. The materials separate along the sleeve's minor axis by way of perforations. Both materials used to form the sleeve have to have qualities to satisfy protective bag requirements.

SUMMARY

The present invention desires to provide a sleeve or bag which uses material that has highly desirable aesthetic qualities without sacrificing the durability found in bags made of traditional shipping materials. The bag utilizes highly desirable decorative material without sacrificing durability by incorporating a first decorative panel over an exterior lower surface of a first panel. The bag also incorporates a second decorative panel over an exterior lower surface of a second panel. The first panel, second panel, first decorative panel and second decorative panel are only joined together along the sleeve or bag's (container's) first and second longitudinal seams. The seams are formed by heat sealing.

Accordingly, the plant flat-collapsible-container which is the subject of the present invention includes a first panel made of a thin, heat-sealable film and a second panel made of a thin, heat-sealable film. The first and second panels are disposed one on top of the other. A first decorative panel is disposed over an exterior portion of the first panel. A second decorative panel is disposed over an exterior portion of the second panel. The first panel, second panel, first decorative panel and second decorative panel are joined together along a first longitudinal seam and a second longitudinal seam to form longitudinally-extending sides of the container.

The first panel, second panel, first decorative panel and second decorative panel each have a transversely-extending long edge. The first panel transversely-extending long edge is freely separable from the second panel to form a large opening into an interior of the container. The first decorative panel transversely-extending long edge is freely separable from the first panel. The second decorative panel transversely-extending long edge is freely separable from the second panel. The container has a transversely-extending short side opposite the transversely-extending long edges.

The first longitudinally-extending seam forms a first angle respective to a line drawn transverse to the axis of the container. The second longitudinally-extending seam forms a second angle respective to the line drawn transverse to the axis of the container. The first and second angles can be the same. Alternatively, the first angle can be between 55° and 65°, and the second angle can be between 85° and 90°. In a configuration having different angles, the first angle is preferably 60° and the second angle is 90°.

The flat-collapsible-container can have a protruding strip formed from a group of structures consisting of: a second panel transversely-extending long edge protruding beyond a first panel transversely-extending long edge, a second panel transversely-extending short edge protruding beyond a first panel transversely-extending short edge, and the second panel transversely-extending short edge protruding beyond a transversely-extending short seam. The transversely-extending short seam is opposite the first panel transversely-extending long edge and extends into the first and second longitudinally-extending seams.

The flat-collapsible-container can further include a tear line made of perforations extending along the protruding strip.

DETAILED DESCRIPTION

Figure 1:
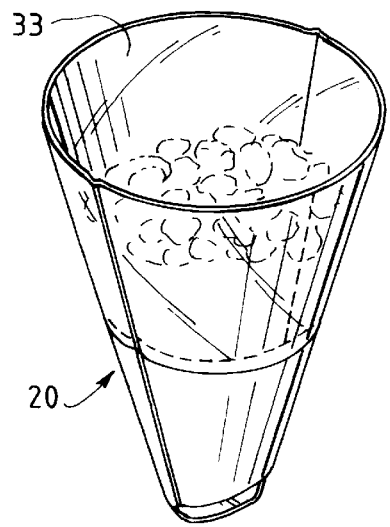
FIG. 1 is a top perspective view showing a filled plant flat-collapsible-container, which is the subject of the present invention.
Figure 2:
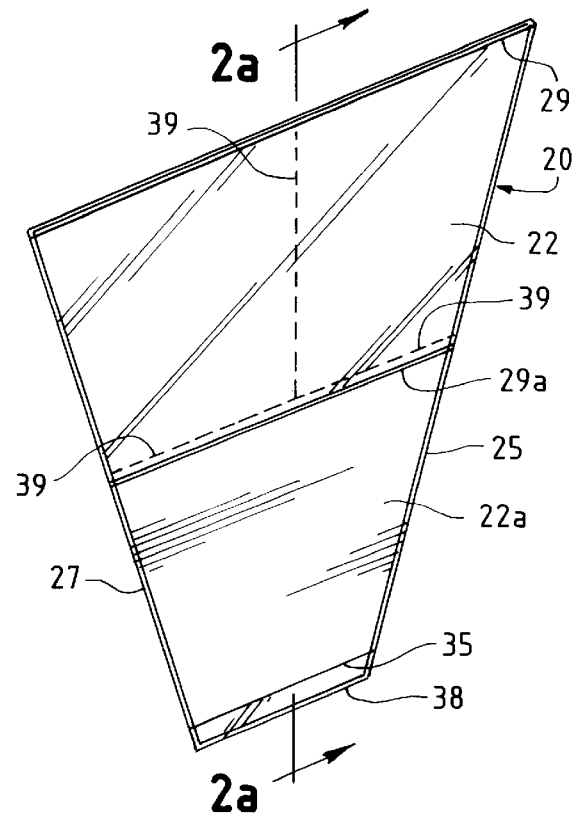
FIG. 2 is a top front perspective view of the empty plant flat-collapsible-container; the view looks towards the container into the first panel.
Figure 2A:
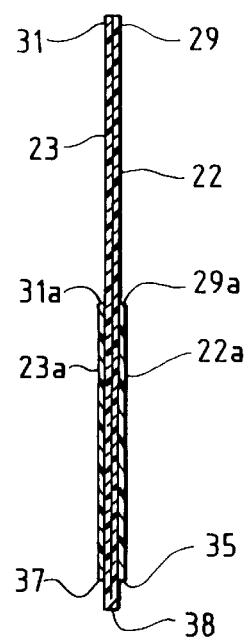
FIG. 2a is a cross-section taken along the view lines shown in FIG. 2.
Figure 3:
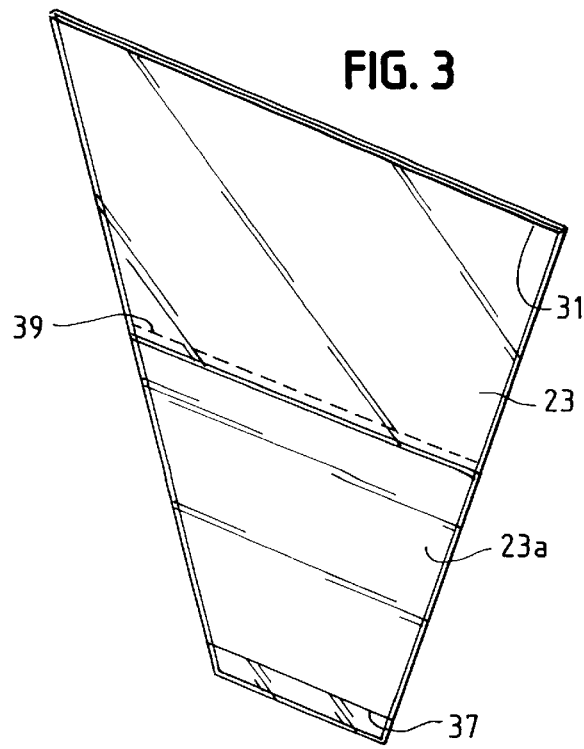
FIG. 3 is a top back perspective view of the empty plant flat-collapsible container looking into the second panel.
Figure 4:
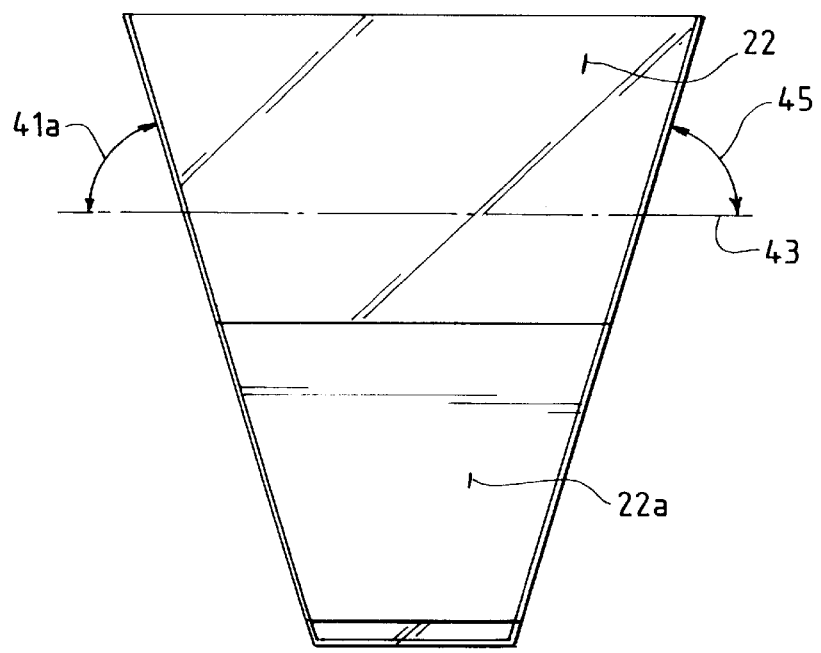
FIG. 4 is a front view of the empty container looking towards the first panel.
Figure 5:
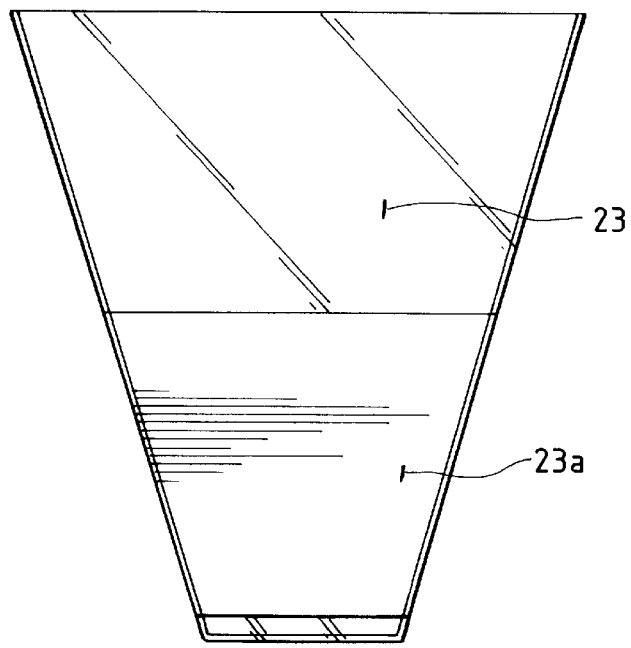
FIG. 5 is a back view of the empty container looking into the second panel.
Figure 6:
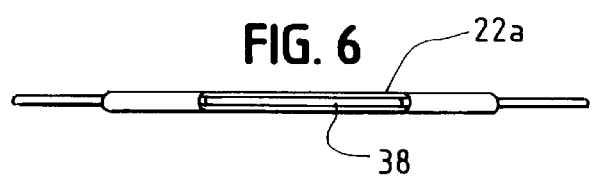
FIG. 6 is a bottom view of the empty container.

Referring to FIGS. 1–8, the shown plant flat-collapsible-container holds a potted plant. The collapsible container 20 includes a first panel 22 on top of a second panel 23. It also includes a first decorative panel 22a over a lower exterior surface of the first panel 22 and a second decorative panel 23a over a lower exterior surface of the second panel 23. The first panel, second panel, first decorative panel and second decorative panel are only joined together along a first longitudinal seam 25 and a second longitudinal seam 27. The longitudinally-extending borders of the first and second decorative panels are co-extensive with the first and second longitudinally-extending seams. The container has a first panel transversely-extending long edge 29, and a second panel transversely-extending long edge 31. The first and second long edges are freely separable from each other and open up to form a large opening 33 into the interior of the container.

The container further has a first decorative panel transversely-extending long edge 29a and a second decorative panel transversely-extending long edge 31a. The first decorative panel long edge 29a is freely separable from the first panel. The second decorative panel long edge 31a is freely separable from the second panel. The decorative panel extending long edges form transverse borders of the decorative panels.

The container also has a first decorative panel transversely-extending short edge 35 and a second panel transversely-extending short edge 37. The first decorative panel transversely-extending short edge is freely separable from the first panel. The second transversely-extending short edge is freely separable from the second panel. The decorative panel short edges form transverse borders of the decorative panels. The container has a transversely-extending short side 38. The side forms a closed end of the container. The short side can be formed by heat sealing the first and second panel bottom edges. The container also has a tear line 39 which functions to allow a person to tear the upper portion of the sleeve away from the lower decorative portion of the sleeve.

A packer places a potted plant into the container by opening the container at its large opening 33. The potted plant is then placed inside the container. The foliage generally does not project above the first and second panel transversely-extending long edges 29, 31. The upper portion of the sleeve can later be separated from the lower decorative portion by tearing the sleeve along tear line 39.

The container's first longitudinally-extending seam 25 can form a first angle 41 respective to a line drawn transverse to the axis of the container. The second longitudinally-extending seam can form a second angle 45 respective to the transverse axis 43 of the container. The first and second angles can be the same.

Alternatively, referring to FIGS. 10–13, the first angle 41a can be between 55° and 65°, and the second angle 45a can be between 85° and 90°. In a configuration having different angles, the first angle is preferably 60° and the second angle is preferably 90°. The two-angle configuration causes the container when filled to form a pickup point 201. The pickup point forms because a portion of the container, at the intersection of the container's first panel long edge 29 and its 60°-angulated side 25, projects further upwards than a portion of the container at the intersection of the container's first panel long edge 29 and 90°-angulated side 27. The pickup point makes it easier for a user to handle the filled container during packing (see FIGS. 10–13). It will be noted the perforations 39 are not present on these figures.

Figure 7:
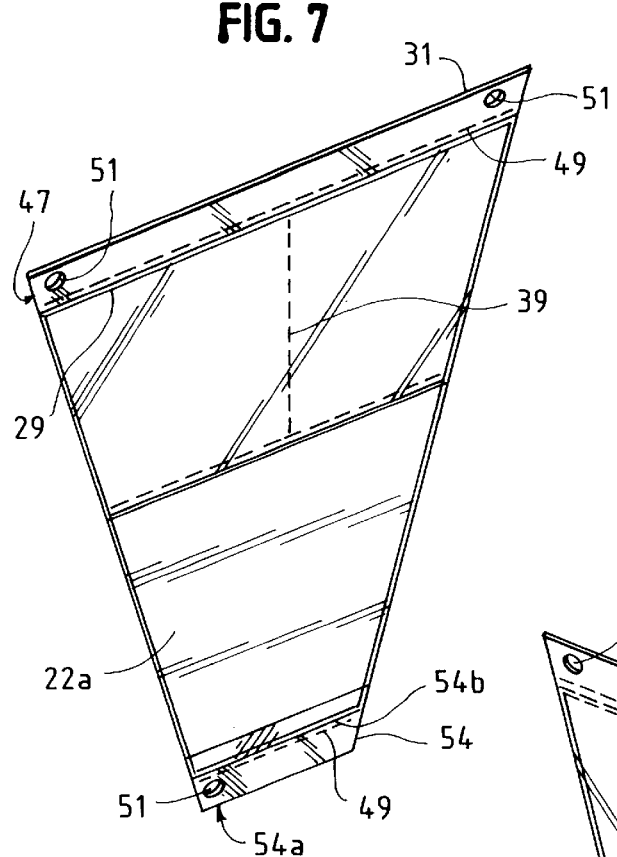
FIG. 7 discloses a first alternative embodiment of the empty container, shown from the same view as FIG. 2, in which a second panel transversely-extending long edge of the container extends beyond the container's first panel transversely-extending long edge, and a second panel transversely-extending short edge of the container extends beyond the container's transversely-extending short seam.
Figure 8:
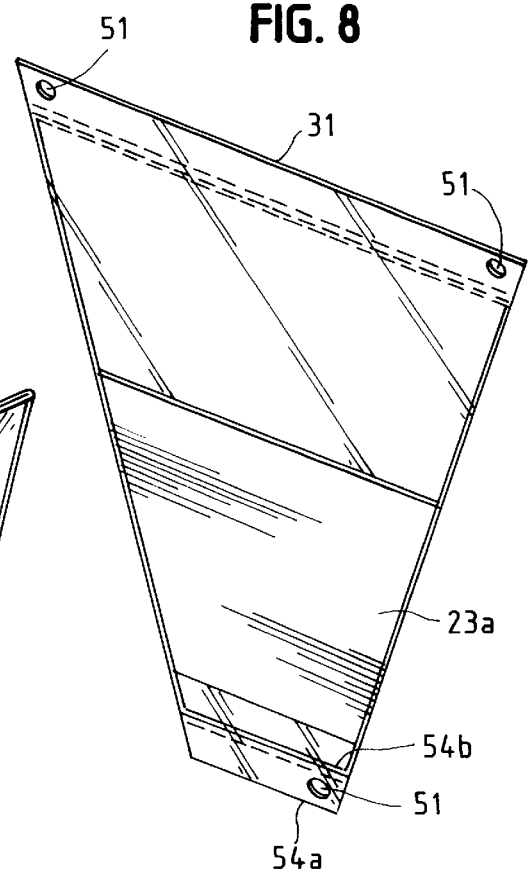
FIG. 8 shows the first alternative embodiment from the same view as FIG. 3.

FIGS. 7 and 8 show an alternative embodiment in which the second panel transversely-extending long edge 31 is longitudinally spaced from the first panel transversely-extending long edge 29 so that the second panel transversely-extending long edge 31 protrudes beyond the first panel transversely-extending long edge 29. Having the second edge protruding beyond the first edge allows for a protruding portion 47 of the second panel 23 to be folded over the first panel 22 to provide a cover. The protruding portion of the second panel can have an adhesive strip (not shown).

The protruding portion 47 can also function as a tear strip. To form a tear strip, a series of perforations 49 are disposed on the protruding portion 47 of the second panel 23. The perforations form a tear line.

A plurality of containers can be bonded together along the protruding portion 47. The protruding portion 47 can include one or more large openings 51 through which a rod can extend. The plurality of bonded containers can then be hung on the rod. A user can separate a single container from the bonded plurality of containers by tearing each container off from the plurality one by one along the tear line formed by perforations 49.

Still referring to FIGS. 7 and 8, the container can also include a protruding portion 54 at the container's small transverse side in addition to or in place of the protruding portion 47. To form the protruding portion 54 at the small transverse side, a second panel transversely-extending short edge 54*a* is longitudinally spaced from a transversely-extending short seam 54*b* so that the second panel short edge 54*a* extends beyond the short seam 54*b* to form the second panel protruding portion 54. The short seam 54*b* forms the container's closed end. The protruding portion of the second panel can be utilized as a tear strip by applying perforations 49. Additionally, the tear strip at the short transverse side could also have holes 51 to allow a plurality of bonded sheets to be hung on a rod or rods.

The container can have perforations (not shown) to allow for the circulation of air within the interior of the bag.

Figure 9:
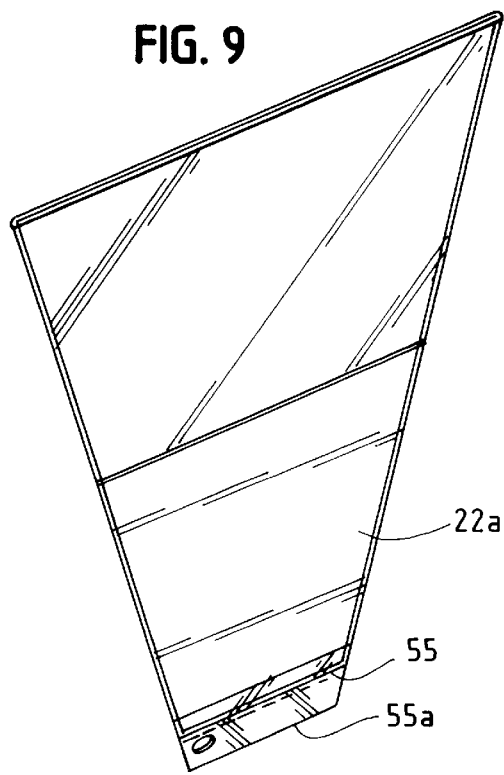
FIG. 9 shows a second alternative embodiment of the empty container from the same view as FIG. 2, in which the container has a first panel transversely-extending short edge and a second panel transversely-extending short edge; the second edge protrudes beyond the first edge.
Figure 10:
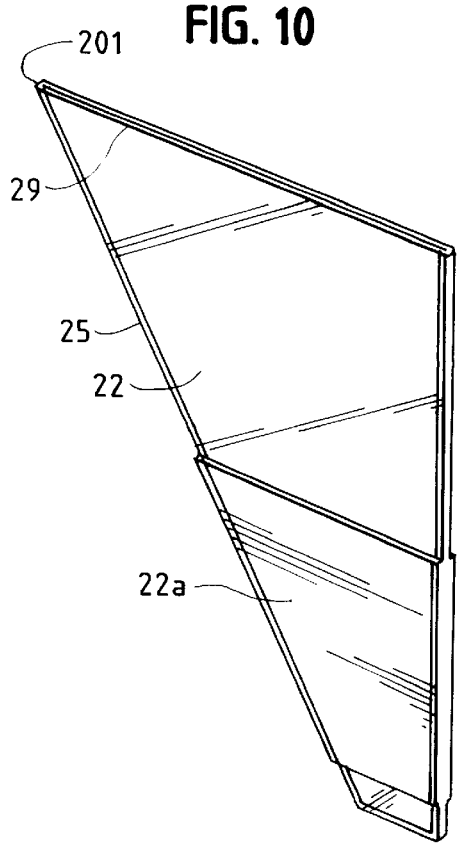
FIG. 10 is a third alternative embodiment of a top front perspective view of the plant container; the container has an angulated seam of 90°.
Figure 11:
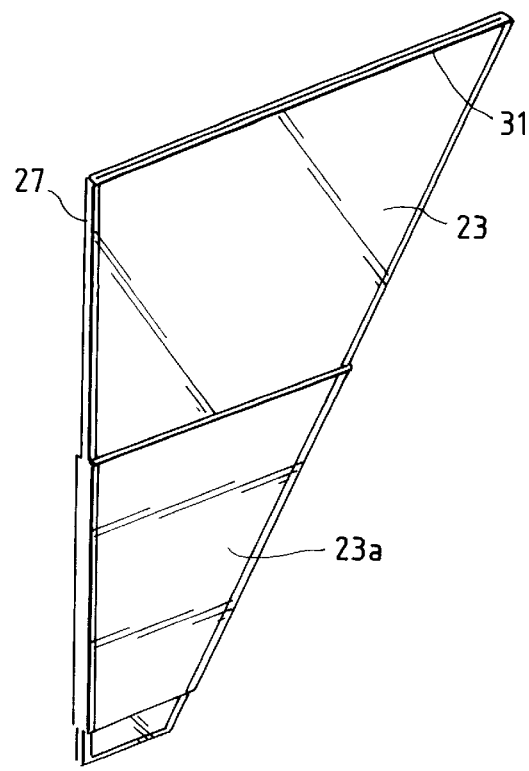
FIG. 11 is a top back perspective view of the third alternative embodiment of the container.
Figure 12:
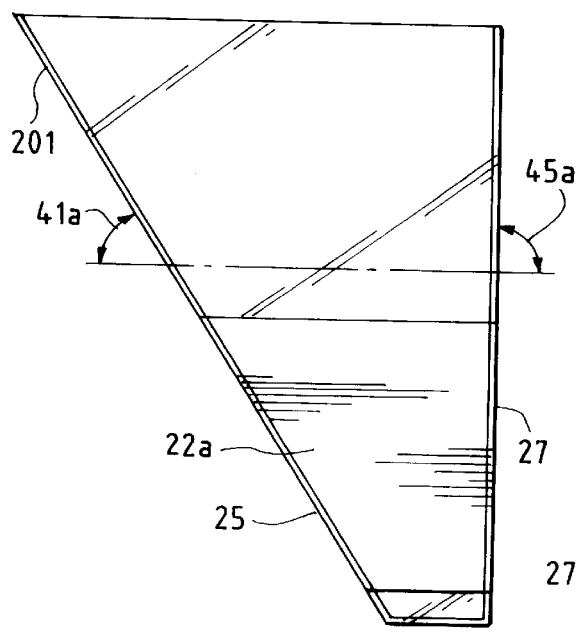
FIG. 12 is a front view of the third alternative embodiment of the container.
Figure 13:
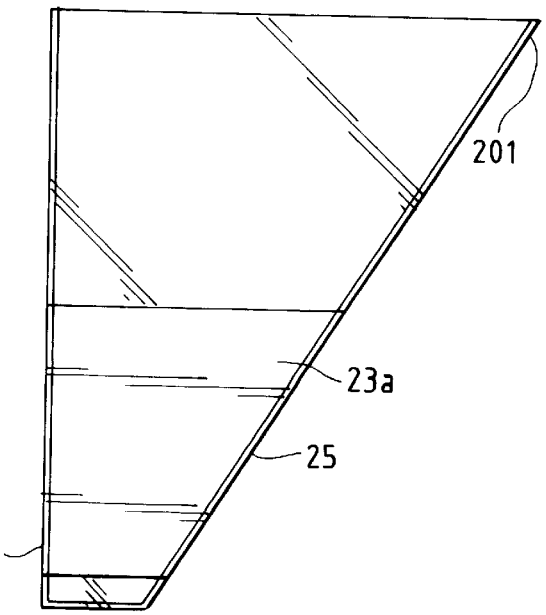
FIG. 13 is a back view of the third alternative embodiment of the container.

As a further alternative, as shown in FIG. 9, the flat-collapsible-container, rather than having a closed end (short seam), could have an open end opposite the mouth. The container is similar to the container described in FIGS. 1–8. The flat-collapsible-container shown in FIG. 9 includes a first panel transversely-extending short edge 55 and a second panel transversely-extending short edge 55*a*. The transversely-extending short edge 55 is separable from the second panel to provide an exit. The container thus forms a sleeve. The sleeve generally would be used to hold cut flowers. To alter the aesthetics of the sleeve, the decorative panels 22*a*, 23*a* could be affixed to the upper portion of panels 22 and 23 (not shown). The sleeve would thus have decorative panels forming the exterior of its upper portion, rather than its lower portion. The container does not have perforations 39.

It is important to note that the present invention has been described with reference to an example of an embodiment of the invention. The specification and drawings are therefore to be regarded in an illustrative rather than a restrictive sense. It would be apparent to those skilled in the art that a person understanding this invention may conceive of changes or other embodiments or variations which utilize the principles of the invention without departing from the broader spirit and scope of the invention as set forth in the appended claims. All are considered within the spirit and scope of the invention. Accordingly, it is not intended that the invention be limited except as may be necessary in view of the appended claims.

What is claimed is:

1. A plant flat collapsible container comprising:

a first panel made of thin, heat-sealable film;

a second panel made of thin, heat-sealable film, said second panel opposite said first panel;

a first decorative panel opposite and over an exterior portion of said first panel;

a second decorative panel opposite and over an exterior portion of said second panel;

a first longitudinally-extending seam and a second longitudinally-extending seam, said first and second panels joined together along said first and second longitudinally-extending seams;

a first panel transversely-extending long edge forming an edge of said first panel;

an open position in which said first panel transversely-extending long edge is separated from said second panel to form a large opening into an interior of the container;

a short transversely-extending side defined by said container, said short transversely-extending side opposite said first panel transversely-extending long edge, wherein said first longitudinally-extending seam forms a first angle with a line drawn transverse to an axis of the container; and said second longitudinally-extending seam forms a second angle with said line drawn transverse;

wherein said first decorative panel has a first decorative longitudinally-extending border and a second decorative longitudinally-extending border, and more than one-half of the first decorative panel is over the exterior portion of said first panel, and wherein the first decorative panel is joined to said container only along the first and second decorative longitudinally-extending borders.

\* \* \* \* \*